United States Patent [19]

Mink et al.

[11] 3,723,567

[45] Mar. 27, 1973

[54] STABLE ORGANOSILICON COMPOSITIONS

[75] Inventors: Alan E. Mink; Darrell D. Mitchell, both of Midland, Mich.

[73] Assignee: Dow Corning Corporation, Midland, Mich.

[22] Filed: Aug. 25, 1971

[21] Appl. No.: 174,954

[52] U.S. Cl..........260/825, 117/161 ZA, 260/37 SB, 260/46.5 G, 260/46.5 UA
[51] Int. Cl. .............................................C08g 47/02
[58] Field of Search..........260/46.5 UA, 46.5 G, 825

[56] References Cited

UNITED STATES PATENTS 3,020,260   2/1962   Nelson................................260/46.5
3,453,233   7/1969   Flatt...................................260/46.5

*Primary Examiner*—Donald E. Czaja
*Assistant Examiner*—Melvyn I. Marquis
*Attorney*—Robert F. Fleming, Jr. et al.

[57] ABSTRACT

Organosilicon compositions comprising a first component having at least two monovalent hydrocarbon radicals containing aliphatic unsaturation per molecule, a second component containing at least two silicon-bonded hydrogen atoms, and a platinum catalyst are inhibited by the addition of an amine-functional silane to decrease the rate of curing at room temperature. The compositions can be readily cured at elevated temperatures to provide coating resins, potting compounds and silicone elastomers.

10 Claims, No Drawings

STABLE ORGANOSILICON COMPOSITIONS

This invention relates to a heat activated curing system for organosilicon compounds. In one aspect, the invention relates to a stable mixture of copolymerizable organosilicon compositions containing a platinum catalyst. In another aspect, the invention relates to a method of inhibiting the activity of platinum catalysts utilized in curing organosilicon compositions.

Many uses of organosilicon compositions require initially that the materials be easily formed to a desired shape or flowable so that the material can be applied to surfaces of articles, after which the material is cured and retains the desired configuration. These polymeric materials are available as fluid resins which can be used to encapsulate or coat electrical devices and thereafter cured to be nonflowable. Organosiloxane elastomers are supplied as formable materials ranging from thin pastes to stiff plastic gum-like materials which can be shaped by various molding processes and then cured to a rubber-like state. Cured organosilicon articles retain their shape, or if deformed, as in the case of an elastomer, will seek to return to their cured configuration.

Several methods of curing organosilicon compositions are available. Certain of the curing systems require heat to activate the necessary crosslinking of polymer molecules. U.S. Pat. No. 3,020,260 describes a curing system in which platinum is utilized to catalyze the reaction of $\equiv$SiH with $CH_2$=CHSi$\equiv$ to obtain crosslinking. This system is active to a certain extent at room temperature and such catalyzed mixtures have a relatively short shelf life or working time. The present invention provides inhibitors for these platinum catalyzed curing systems which result in organosilicon compositions having extended shelf life.

Thus, it is an object of the invention to provide new heat activated curable organosilicon compositions.

It is another object of the invention to provide curable organosilicon compositions having extended shelf life.

In accordance with the present invention there are provided organosilicon compositions comprising a curable composition comprising (a) an organopolysiloxane consisting essentially of the formula $R_nSiO_{(4-n)/2}$ in which R is selected from the group consisting of monovalent hydrocarbon radicals, monovalent halohydrocarbon radicals free of aliphatic unsaturation and cyanoalkyl radicals; there being at least two monovalent hydrocarbon radicals containing aliphatic unsaturation per molecule of $a$ and $n$ is an integer having a value of from 1 to 3; and (b) a hydrogen polysiloxane consisting essentially of units of the formula $R'_mSiO_{(4-m)/2}$ in which $R'$ is selected from the group consisting of the hydrogen atom, monovalent hydrocarbon radicals free of aliphatic unsaturation, monovalent halohydrocarbon radicals free of aliphatic unsaturation and cyanoalkyl radicals, there being at least two silicon-bonded hydrogen atoms per molecule of $b$; and $m$ is an integer having a value of from 1 to 3 inclusive; (c) a platinum catalyst in an amount sufficient to provide at least 0.1 part platinum per million parts of the combined weight of $a$ and $b$; and (d) an amine-functional silane of the formula $Z_2N-R''-SiX_3$ in which X is selected from the group consisting of the chlorine atom, alkoxy radicals containing from 1 to 4 inclusive carbon atoms, alkyl radicals containing from 1 to 18 carbon atoms and the phenyl radical; $R''$ is a divalent hydrocarbon radical free of aliphatic unsaturation containing at least 3 carbon atoms, the $Z_2N-$ group attached to a carbon atom at least 3 removed from the silicon atoms; and Z is selected from the group consisting of the hydrogen atom, amino-substituted monovalent hydrocarbon radicals free of aliphatic unsaturation, and monovalent hydrocarbon radicals free of aliphatic unsaturation said silane being present in an amount sufficient to reduce activity toward curing at temperatures below 50°C.

The organopolysiloxane component $a$ can be a resin, fluid or a substantially nonflowing high polymer, depending upon the degree of substitution $n$ and molecular weight of the siloxane. As described above, the R substitutents of the siloxane $a$ include monovalent hydrocarbon radicals such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1.$^{3.8}$]-5-nonenyl, spiro[4.5]decyl, dispiro[4.1.4.2-1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

Other suitable substituents include monovalent halohydrocarbon radicals such as aliphatic groups such as chloromethyl, 3-chloropropyl, 3,3,3-trichloropropyl, perfluorovinyl, chlorooctadecyl or radicals of the formula $R_fCH_2CH_2$ where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, alpha,alpha,alpha-trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl)ethyl or beta-(iodophenyl)ethyl or beta-(bromophenyl)propyl.

Exemplary cyanoalkyl radicals include beta-cyanoethyl, gamma-cyanopropyl, beta-cyanopropyl, omega-cyanooctadecyl and the like.

The organopolysiloxane $a$ must have an average of at least two radicals having aliphatic unsaturation, such as the vinyl, allyl, methallyl or butadienyl radicals. More than two such radicals can be present but a minimum of two (average per molecule) is necessary to obtain curing. When the average number of aliphatically unsaturated substituents is greater than two, more crosslinking occurs and a correspondingly tighter cure is obtained.

The monovalent organic substituents of $a$ can be the same or different. The aliphatically unsaturated radicals can be the same or different. The organopolysiloxanes are produced by the hydrolysis and condensation of the corresponding hydrolyzable silanes; thus, minor amounts of uncondensed silicon-bonded hydroxyl groups may be present in $a$. The preferred R substituents are those which contain from 1 to 18 carbon atoms. Especially preferred, because of their availability, are organopolysiloxanes having R substituents selected from the group consisting of lower alkyls containing from 1 to 6 carbon atoms, phenyl, vinyl and 3,3,3-trifluoropropyl radicals.

The hydrogen-functional polysiloxane $b$ can be any organopolysiloxane containing at least two silicon-bonded hydrogen atoms per molecule and in addition has an average of up to two monovalent organic radicals per silicon atom. As described, these R' substituents can be monovalent hydrocarbon radicals, such as the substituents free of aliphatic unsaturation exemplified in the definition of R. Also, the R' groups can be monovalent halohydrocarbon radicals free of aliphatic unsaturation and cyanoalkyl radicals, both of which are exemplified in detail in the description of R. As with the R substituents, the preferred R' radicals are those containing from 1 to 18 carbons, with methyl, phenyl and 3,3,3-trifluoropropyl radicals being most preferred.

Methods of preparing organosiloxane components $a$ and $b$ are well known in the art. Many such materials are commercially available. Thus, recitation of these methods of preparation herein would be redundant.

The selection of components $a$ and $b$ is somewhat inter-related. When the average number of aliphatically unsaturated groups per molecule in component $a$ is 2.0, a component $b$ should be selected wherein the average number of silicon-bonded hydrogen atoms per molecule is at least 2.0, so that the total of these just defined quantities is 4. The analogous is true when the chosen component b contains 2.0 (average) silicon-bonded hydrogen atoms per molecule. When either component has the defined quantity greater than 2.0, selection of the other component on this basis is irrelevant. It should be understood, of course, that the higher the sum of these quantities, the more highly crosslinked the resulting composition will be.

The molar ratio of aliphatic unsaturated radicals in $a$ to the silicon-bonded hydrogen atoms in b can in some cases be an important consideration. Where it is important, the ratio of these two should be preferably between 0.67 and 1.5. However, there are many instances wherein a balance of these two quantities is unimportant. For example, if a component $a$ has, say, an average of six aliphatic unsaturated groups per molecule, the use of equal molar amounts of silicon-bonded hydrogen atoms may well give a product too tightly crosslinked for the desired end use. Thus, less than, sometimes much less than, the equal molar amount of SiH would be used to provide the desired degree of cure. However, when maximum stability is required it is desirable to match the molar quantities of silicon-bonded hydrogen atoms in $b$ to the aliphatic unsaturated radicals in $a$.

Platinum compound $c$ can be any of the known forms, ranging from platinum as such or as deposited on carriers such as silica gel, alumina or powdered charcoal, to platinic chloride, salts of platinum and chloroplatinic acid. Any of these forms will function in the instant system. A preferred form of platinum is the chloroplatinic acid either as the commonly obtainable hexahydrate or the anhydrous form, on account of its easy dispersibility in organosilicon systems and its noneffect on color of the mixture. Additional platinum compounds include, $PtCl_2[P(CH_2CH_2CH_3)_3]_2$, platinum bromides, a complex of platinous halide and an olefin such as ethylene, propylene, butylene, cyclohexane and styrene, $Pt(CH_3CN)_2Cl_2$, $[Pt(CH_3CN)_2(CH_3)_4]Cl_2$, $Pt(NH_3)_2Cl_2$,

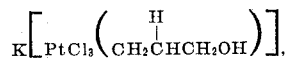

$K[PtCl_3(CH_2CHCH_2OH)]$, $PtBr_2(C_2H_4)_2$, $K[PtBr_3(C_2H_4)]$, $PtCl_2(C_2H_4)$, $(CH_3)_2C=CH_2 \cdot PtCl_2$, $H_2Pt(CN)_4 \cdot 5H_2O$, $H[PtCl_3(CH_3CN)]$, $Pt(NH_3)_2(CNS)_2$, $[Pt(CH_3)_4] \cdot [PtCl_4]$, $PtCl_2[P(CH_2CH_3)_{32}$, $PtCl_2 \cdot PCl_3$, $PtCl_2 \cdot P(OH)_3$, $PtCl_2 \cdot P(OCH_2CH_3)_3$, $PtCl_2 \cdot [P(OCH_2CH_3)_{32}$, $Pt(OOCCH_2SCH_{2d}{}^{CH}{}_3)_2$, $Pt(CN)_3$, $(CH_3)_4Pt$, $(CH_3)_3Pt-Pt(CH_3)_3$,

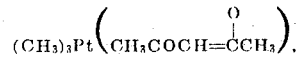

$(CH_3)_3Pt(CH_3COCH=CCH_3)$, $PtCl_2CO$ and $PtBr_2CO$.

There should be at least 0.1 part per million of platinum present in the mixture, based on the combined total weight of $a$ and $b$. However, since impurities in the system may easily poison this small quantity of catalyst, it is preferred to employ from 1 to 20 parts per million of platinum. A greater amount of the platinum does not affect the reaction, but does affect the requirement of component $d$ above, and economic considerations suggest the lower amounts mentioned. When present in sufficient amount, component $d$ completely prevents the platinum from catalyzing at room temperature (and up to about 60°C.) the reaction between the SiH in $b$ and aliphatically unsaturated radicals in $a$.

The amine-functional silane $d$ is utilized as the inhibitor in the curable composition of the invention and is of the general formula $Z_2N-R''-SiX_3$ in which X, R'' and Z are as described above The X substituents may be the same or different and include the chlorine atom, the phenyl radical, alkoxy radicals, such as methoxy and ethoxy groups, and alkyl radicals, such as methyl, ethyl, butyl, hexyl, dodecyl and octadecyl groups.

In the silane formula, R'' can be any divalent hydrocarbon radical free of aliphatic unsaturation which contains at least 3 carbon atoms, for example, $-CH_2CH_2CH_2-$, $-CH_2CH_2CH_2CH_2-$, $-CH_2CH(CH_3)CH_2-$, $-CH_2CH_2CH_2CH(CH_3)CH_2-$,

cyclopentylene, $-C_{10}H_{28}-$, $-C_{18}H_{36}-$, $-C_6H_4-$, and the like.

Z can be (in addition to hydrogen) a monovalent hydrocarbon radical free of aliphatic unsaturation, such as those described with respect to R' (preferably having no more than 6 carbon atoms) or an amino-substituted monovalent hydrocarbon radical, such as — $CH_2CH_2NH_2$, $-CH_2CH_2CH_2NH_2$, $-CH_2CH(CH_3)NH_2$, $-CH_2CH_2[NHCH_2CH_2]_3NH_2$, $-CH_2(CH_2)_5CH_2NH_2$,

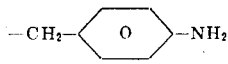

and

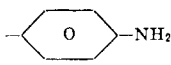

These amine-functional silanes are well known in the art and can be prepared by conventional methods. Exemplary of these silanes are $H_2NCH_2CH_2NHCH_2CH_2$ $H_2Si(OCH_3)_3$ $H_2NCH_2CH_2CH_2Si(OC_2H_5)_3$,

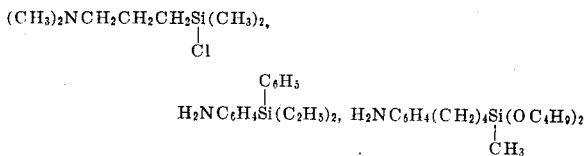

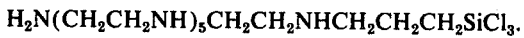

$H_2N(CH_2CH_2NH)_5CH_2CH_2NHCH_2CH_2CH_2SiCl_3$.

The amount of amine functional silane added to the curable composition can be varied depending upon such characteristics as the type and amount of platinum catalyst utilized, the degree of inactivity desired in the curing system and the particular type of unsaturated siloxane and hydrogen siloxane employed. It is generally desirable that the silane be added in an amount sufficient to provide at least 1 mole of nitrogen per mole of platinum catalyst and preferably from 2 to 200 moles of nitrogen per mole of catalyst. If increased inhibition is desired, the amount of silane is increased while if it is desired to activate the catalyst at lower temperatures, for example, 50°C the amount of silane will be decreased. As the concentration of platinum catalyst in the curable composition is increased, the rate of curing at elevated temperatures is increased and a corresponding greater amount of silane $d$ is required to suppress activity at room temperature or other temperatures at which it is stored. It is also within the scope of the invention to merely retard activity at room temperature rather than completely inhibit such activity. For example, platinum catalyzed resins are often used in dip-coating operations. If the bath life at room temperature of a coating resin can be extended from, for example, four hours to 24 hours, by addition of small amounts of silane, the end-user obtains a great advantage. It is well within the skill of one practicing the invention to determine the optimum amount of silane for use in a specific composition which is desired to cure at a predetermined temperature and rate. The addition of large excesses of silane can render the composition noncurable.

The components of this invention can be mixed in any order. The components can be mixed just prior to use or they can be mixed and stored for later use. One advantageous method is to mix a solution of the catalyst $c$ and silane $d$ in the desired mol ratio and add this solution to a mixture of siloxanes $a$ and $b$.

In addition to the recited components, other materials can be present in a composition utilizing this catalyst system. Such materials as are ordinarily used in organosilicon compositions, such as fillers (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should, of course, be excluded, but these are not normally included in organosilicon compounds designed to be cured by heat activated curing catalysts.

The instant composition can be used for any application requiring a resin or rubber where heat activated curing is possible. It will be recognized that a wide variety of applications are included. The instant curing system can be activated in closed or open systems, in thin or thick sections and under pressure and at atmospheric pressure with equal ease merely by the application of heat above about 70°C.. There is freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibition, and therefore uniform cure throughout the sample. In addition, where desired, the system can serve to control (slow down) the rate of cure of a platinum catalyzed SiH- unsaturated aliphatic-on-silicon at room temperature.

The following examples are illustrative only and should not be construed as limiting the present invention which is properly delineated in the appended claims.

EXAMPLE 1

A vinyl-functional organosilicon resin containing 30 mol percent $C_6H_5SiO_{3/2}$ units, 15 mol percent $CH_3SiO_{3/2}$ units, 30 mol percent $(CH_3)_2SiO$ units, 20 mol percent $CH_2=CH(CH_3)SiO$ units and 5 mol percent $(CH_3)_3SiO_{1/2}$ units, having a viscosity of about 5,000 cs. at 25°C., was mixed with a hydrogen-functional polysiloxane, $C_6H_5SiOSiH(CH_3)_2]_3$, having a viscosity of about 20 cs. at 25°C., in an amount sufficient to provide one ≡ SiH per silicon-bonded vinyl radical. This stoiciometric mixture had a viscosity of about 800 cs. at 25°C. Portions of the polysiloxane mixture were catalyzed with an isopropyl alcohol solution of $[(C_4H_9)_3PPtCl_2]_2$ in combination with $H_2N(CH_2)_2NH(CH_2)_3Si(OCH_3)_3$. For purposes of comparison, the same catalyst was also utilized in combination with pyridine, an inhibitor described in U.S. Pat. No. 3,188,299. In all cases the catalyzed mixture contained 10 ppm. of platinum based on the weight of organopolysiloxane. The stability of several catalyzed compositions was determined by measuring the time necessary to gel the mixtures at various temperatures. Results are given below:

| Inhibitor | Mols N/mol Pt | Time to gel (min.) at — | | | | | |
|---|---|---|---|---|---|---|---|
| | | 175° C. | 150° C. | 125° C. | 10° C. | 75° C. | 50° C. |
| None | | 2 | 2½ | 3½ | 8 | 48 | 420 |
| Pyridine | 250 | 4 | 6½ | 12 | 50 | ~600 | 1,980 |
| $H_2N(CH_2)NH(CH_2)_3Si(OCH_3)_3$ | 10 | 4½ | 9 | 40 | 280 | 1,680 | 13,200 |
| $H_2N(CH_2)_2NH(CH_2)_2Si(OCH_3)_3$ | 13.5 | 5 | 10 | 48 | 420 | | |

These data demonstrate that the amine-functional silanes effectively reduce the curing activity of the catalyzed compositions at lower temperatures (e.g., 50°C.) while not unduly prolonging curing at elevated temperatures. As compared with pyridine, a known organic amine inhibitor, the silanes are effective in lesser amounts. The above-described silane-inhibited resin has particular utility as an insulative coating for the windings of electric motors.

EXAMPLE 2

A vinyl-functional organosilicon resin (330 grams) containing 37.5 mol percent $C_6H_5SiO_{3/2}$ units, 7.5 mol percent $CH_3SiO_{3/2}$ units, 20 mol percent $CH_2$=$CH(CH_3)SiO$ units, 30 mol percent $(CH_3)_2SiO$ units and 5 mol percent $(CH_3)_3SiO$ units was mixed with 75 grams of $C_6H_5SiOSiH(CH_3)_2]_3$. Silica filler (10 grams) was mixed with 135 grams of the above-described siloxane composition. The filler-containing composition was catalyzed with the silane-platinum complex (10 mol N/mol Pt) described in Example 1. The catalyst complex was added in an amount sufficient to provide 10 ppm platinum. An identical composition was formulated except that the silane inhibitor was omitted. The inhibited composition had a shelf life at least four times longer than the shelf life of the unihibited composition as evidenced by the gel time at 75°C.

EXAMPLE 3

The vinyl-functional siloxane/hydrogen-functional siloxane mixture was catalyzed with $[(C_4H_9)_3PPtCl_2]_2$ — isopropyl alcohol solutions which contained differing amounts of $H_2N(CH_2)_3Si(OC_2H_5)_3$. All of the catalyzed compositions contained 10 ppm platinum. The effect of increasing the amount of inhibitor is shown below:

| Mol N/Mol Pt | Gel Time (Min.) At | |
|---|---|---|
| | 150°C. | 75°C. |
| 0/1 | 2 ½ | 35 |
| 10/1 | 4 | 360 |
| 20/1 | 4 | 400 |
| 50/1 | 4 | 1260 |

EXAMPLE 4

Sufficient $(CH_3)_2HSiO[(CH_3)_2SiO]_7[H(CH_3)SiO]_3SiH(CH_3)_2$ was added to a mixture of $[CH_2$=$CH(CH_3)SiO]_x$, $C_6H_5(CH_3)(CH_2$=$CH)$—$SiO[(CH_3)_2SiO]_xSi(CH$=$CH_2)(CH_3)C_6H_5$ and $(CH_3SiO_{3/2})_x$ to provide a composition containing 1.3 = SiH per silicon-bonded vinyl substituent. This was a flowable composition having a viscosity of about 15,000 cs. at 25°C. A catalyst solution of $[(C_4H_9)_3PPtCl_2]_2$ and $H_2N(CH_2)_2NH(CH_2)_3Si(OCH_3)_3$ in isopropyl alcohol (5 mol N/mol Pt) was added to the polysiloxane composition in an amount sufficient to provide 3 ppm platinum. The catalyzed composition was stored at room temperature in a sealed container with no visible increase in viscosity after 28 days. A portion of the stored material was cured for about 10 minutes at 150°C. to obtain a tack-free elastomeric material which was suitable for use as a sealant.

EXAMPLE 5

Silica filler (50 parts by weight) was blended with 100 parts by weight of a polysiloxane gum containing 99 weight percent of vinyl functional base polymer and 1 weight percent of fluid copolymer having 50 mol percent dimethylsiloxy units, 50 mol percent methylhydrogensiloxy units and trimethylsiloxy-endblocking units. This composition was catalyzed with 7 ppm platinum in the form of the uninhibited isopropyl alcohol solution described in Example 1. When tested in a Monsanto Rheometer at 275°F., this material scorched indicating premature vulcanization. The same composition was catalyzed by addition of the same amount of a similar solution which had been inhibited by addition of sufficient $H_2N(CH_2)_2NH(CH_2)_3Si(OCH_3)_3$ to provide 8 mol N/mol Pt. When tested in the same manner, this formulation provided a 5 minute duration before exhibiting a 1° rise in torque units, indicating that the material can be extruded or molded at high temperatures without risk of premature vulcanization. Such a formulation has specific utility in the manufacture of rubber tubing which can later be vulcanized at higher temperatures.

That which is claimed is:

1. A curable composition comprising
   a. an organopolysiloxane consisting essentially of the formula $R_nSiO_{(4-n)/2}$ in which R is selected from the group consisting of monovalent hydrocarbon radicals, monovalent halohydrocarbon radicals free of aliphatic unsaturation and cyanoalkyl radicals; there being at least two monovalent hydrocarbon radicals containing aliphatic unsaturation per molecule of a and $n$ is an integer having a value of from 1 to 3; and
   b. a hydrogen polysiloxane consisting essentially of units of the formula $R'_mSiO_{(4-m)/2}$ in which R' is selected from the group consisting of the hydrogen atom, monovalent hydrocarbon radicals free of aliphatic unsaturation, monovalent halohydrocarbon radicals free of aliphatic unsaturation and cyanoalkyl radicals, there being at least two silicon-bonded hydrogen atoms per molecule of b; and $m$ is an integer having a value of from 1 to 3 inclusive;
   c. a platinum catalyst in an amount sufficient to provide at least 0.1 part platinum per million parts of the combined weight of a and b; and
   d. an amine-functional silane of the formula $Z_2N$—$R''$—$SiX_3$ in which X is selected from the group consisting of the chlorine atom, alkoxy radicals containing from 1 to 4 inclusive carbon atoms, alkyl radicals containing from 1 to 18 carbon atoms and the phenyl radical; R'' is a divalent hydrocarbon radical free of aliphatic unsaturation containing at least 3 carbon atoms, the $Z_2N$— group attached to at least the third carbon atom removed from the silicon atom; and Z is selected from the group consisting of the hydrogen atom, amino-substituted monovalent hydrocarbon radicals free of aliphatic unsaturation, and monovalent hydrocarbon radicals free of aliphatic unsaturation;

said silane being present in an amount sufficient to reduce activity toward curing at temperatures below 50°C.

2. A composition in accordance with claim 1 wherein R is a monovalent hydrocarbon radical containing from 1 to 18 inclusive carbon atoms.

3. A composition in accordance with claim 2 wherein R' is selected from the group consisting of the hydrogen atom, monovalent hydrocarbon radicals free of aliphatic unsaturation containing from 1 to 18 inclusive carbon atoms and monovalent halohydrocarbon radicals free of aliphatic unsaturation containing from 1 to 18 inclusive carbon atoms.

4. A composition in accordance with claim 3 wherein R is selected from the group consisting of methyl, phenyl and vinyl radicals and R' is selected from the group consisting of the hydrogen atom, the methyl radical and the phenyl radical.

5. A composition in accordance with claim 3 wherein R'' is a $-(CH_2)_3-$ radical.

6. A composition in accordance with claim 3 wherein the amine-functional silane $d$ is present in an amount sufficient to provide at least one mole of nitrogen per mole of platinum present in catalyst $c$.

7. A composition in accordance with claim 6 wherein the amine-functional silane $d$ is $H_2NCH_2CH_2NHCH_2CH_2h_2Si(OCH_3)_3$.

8. A composition in accordance with claim 6 wherein the amine-functional silane $d$ is $H_2NCH_2CH_2CH_2Si(OC_{25})_3$.

9. A composition in accordance with claim 6 wherein the amine-functional silane d is present in an amount sufficient to provide from 2 to 200 moles of nitrogen per mole of platinum present in catalyst $c$.

10. A composition in accordance with claim 9 wherein the catalyst $c$ is a platinum halide and is present in an amount in the range of from 1 to 20 parts per million part of the combined weight of $a$ and $b$.

* * * * *